(No Model.) 2 Sheets—Sheet 1.
E. E. HILLS.
SEED DRILL.
No. 598,093. Patented Feb. 1, 1898.
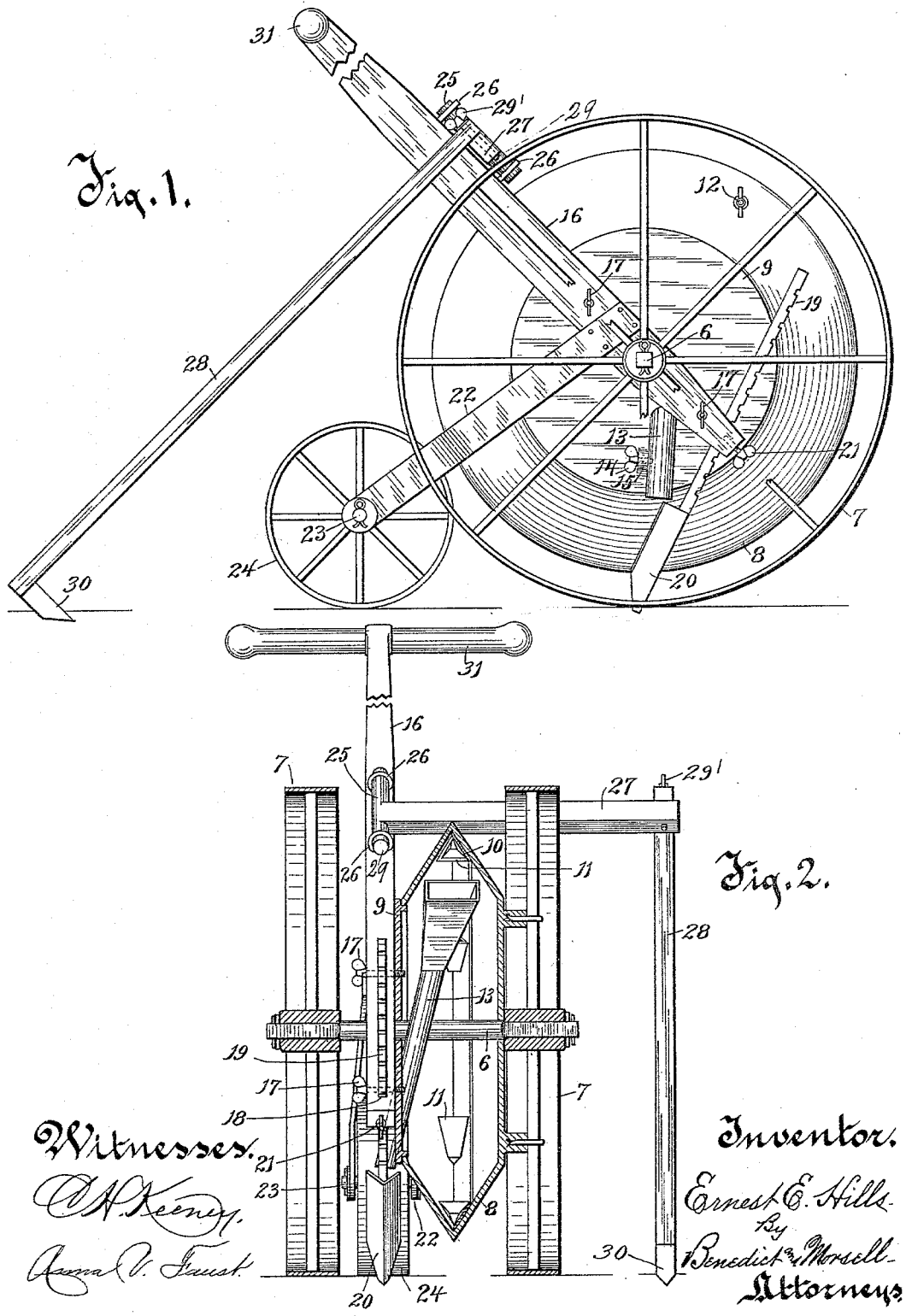
Witnesses.
O. H. Keeney
Anna V. Faust
Inventor.
Ernest E. Hills
By Benedict & Morsell
Attorneys
THE NORRIS PETERS CO., PHOTO-LITHO., WASHINGTON, D. C.

(No Model.) 2 Sheets—Sheet 2.
E. E. HILLS.
SEED DRILL.
No. 598,093. Patented Feb. 1, 1898.
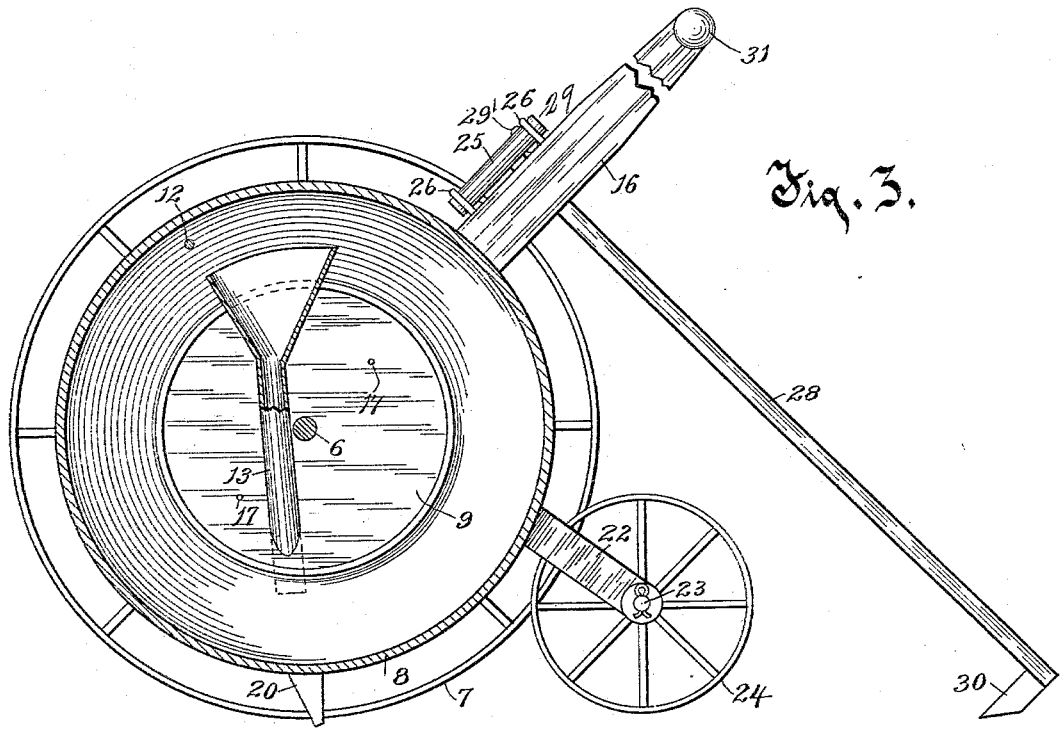
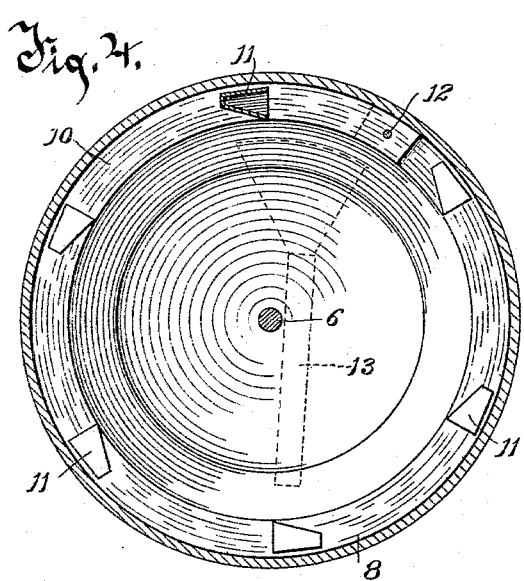
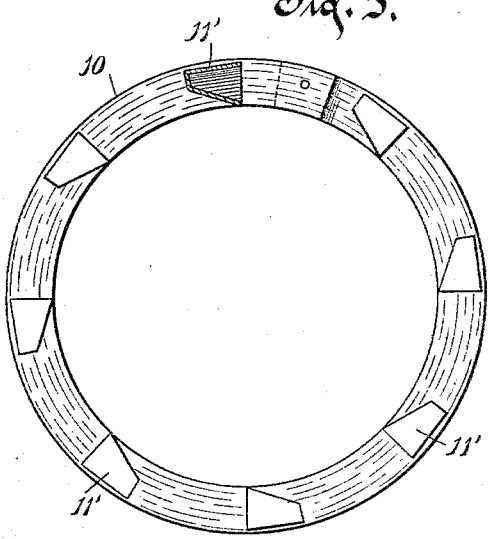
Witnesses. Inventor.
C. H. Keeney Ernest E. Hills
Anna V. Faust By Benedict & Morsell
Attorneys.

UNITED STATES PATENT OFFICE.

ERNEST E. HILLS, OF MEDINA, WISCONSIN.

SEED-DRILL.

SPECIFICATION forming part of Letters Patent No. 598,093, dated February 1, 1898.

Application filed February 26, 1897. Serial No. 625,099. (No model.)

*To all whom it may concern:*

Be it known that I, ERNEST E. HILLS, of Medina, in the county of Outagamie and State of Wisconsin, have invented a new and useful Improvement in Seed-Drills, of which the following is a description, reference being had to the accompanying drawings, which are a part of this specification.

My invention has relation to improvements in seed-drills.

The object of the device is to provide an improved construction of such character as to secure a uniform discharge of the seed and a uniform distribution of the same over the ground, the device being adapted to sow in rows any kind of garden-seed, either large or small, and in any desired quantity.

With the above primary object in view the invention consists of the devices and parts or their equivalents, as hereinafter more fully set forth.

In the accompanying drawings, Figure 1 is a side elevation of the machine. Fig. 2 is a front view showing the seed-receptacle and wheels in transverse section. Fig. 3 is a side elevation with the seed-receptacle in longitudinal section and the upper portion of the seed-spout broken away and looking toward the left of Fig. 2. Fig. 4 is a longitudinal section of the seed-receptacle, one of the seed-cups being in section and looking in a direction opposite to that of Fig. 3; and Fig. 5 is a detail of a modification of the seed-cup holder with the seed-cups arranged therearound, one of said cups being in section.

Referring to the drawings, the numeral 6 indicates the main driving-axle, upon which are rigidly mounted the driving-wheels 7 7. The driving-axle has also fixed thereon intermediate the driving-wheels a seed-receptacle 8, which is of circular form, with its periphery of V shape in cross-section. One side of this receptacle is provided with a central opening, which is closed by means of a cover 9. To the inner side of one of the sloping walls of the V-shaped periphery of the seed-receptacle is adapted to be secured an annular band 10, said band having secured therearound at desired distances apart a number of cups 11. This band therefore constitutes a cup-holder. The band or holder is of very thin flexible metal, so as to enable it to be readily inserted in place in the receptacle through the opening in the side of said receptacle and as readily removed therefrom. When arranged in place within the receptacle, the ends overlap, and one of said ends is preferably thickened, so as to form an augmented surface for a thumb-screw 12, said thumb-screw passing through the periphery of the receptacle and through the overlapping ends of the holder.

The numeral 13 indicates the seed-distributing spout. The greater portion of this spout is located within the seed-receptacle, and its upper end is enlarged or funnel-shaped, so as to readily admit the seed discharged from the cups to pass therein. The lower end of the spout extends through an opening in the cover 9 and is held in proper position by means of a thumb-screw 14, passing through an outstanding lug 15 from the cover and entering the spout.

Mounted fixedly on the shaft 6, between the cover 9 and one of the driving-wheels, is an upwardly-extending inclined beam 16. Thumb-screws 17 17 pass transversely through this beam and engage the cover 9, thereby locking said cover in closed position. Near the lower end of the beam is an opening 18, through which the shank 19 of a furrow-plow 20 passes. This shank is provided along its outer edge with a series of serrations or indentations, which are adapted to be engaged by a set-screw 21, which enters the lower extremity of the beam 16. By this arrangement the plow can be readily adjusted so as to make either a deep or shallow furrow.

Attached to opposite sides of a medial point of the upwardly-extending beam 16 and extending rearwardly downwardly therefrom are arms 22 22. The lower ends of these arms form bearings for an axle 23. Upon this axle is mounted a covering-wheel 24.

Near the upper end of the beam 16 is journaled a longitudinally-arranged rock-shaft 25, the bearings therefor being advisably formed by means of staples 26 26. Extending laterally from a central point of this rock-shaft is an arm 27, to the end of which in turn is connected a marker-beam 28. The connection is formed by means of a pin 29, which is provided with threads adapted to be engaged by a wing-nut 29'. To the lower extremity of the marker-beam is connected a downwardly-extending pointed finger 30, forming the marker proper. At the extreme upper end of the upwardly-inclined beam 16 is formed a transverse hand-grasp or handle 31.

In the operation of my invention the seed to be planted are placed within the receptacle. The machine is then caused to travel over the ground to be planted by grasping the handle 31 and pushing the machine forwardly. As the main axle revolves the receptacle revolves therewith, and of course as this receptacle revolves the cups 11 are filled with the seed, and when they successively reach the uppermost point, directly above the funnel of the seed-spout, they discharge their contents into said spout, and the spout in turn deposits the seed in the furrow made by the plow 20, the wheels 24 finally covering over the furrow. Fig. 1 shows the proper position of the marking mechanism when the machine is traveling in one direction. When the planter reaches the end of a furrow and is turned so as to travel in the opposite direction, it of course becomes necessary to reverse the position of the marker. This is done merely by grasping the marker-beam and turning the rock-shaft so as to shift said marker-beam to the opposite side of the machine. The wing-nut 29' is then loosened, so that the marker-beam may be turned down to bring the marking-finger in position to drag along the ground, after which of course said wing-nut is again tightened. It will also be observed that the upwardly-inclined beam 16, which carries the longitudinal rock-shaft, is not directly in the center of the machine. Consequently when the marking-beam is on one side of the machine it will extend farther out than when adjusted to the opposite side of the machine. In order to compensate for this and to provide for the mark being of a uniform lateral distance from the machine, no matter in what direction said machine is traveling, the adjustability of the marking-beam 28 is also necessary. When it is desired to adjust the position of the marker-beam so as to cause the mark to be made either closer to or farther away from the machine laterally, the wing-nut 29' is merely loosened, as before, and the beam swung on its pivot 29, so as to bring the lower end of the beam either closer to or farther away from the frame of the machine, after which of course the wing-nut is again tightened.

In Fig. 5 I have shown a somewhat-modified form of seed-cups. The cup-holding band 10 in this figure is shown as provided with a greater number of cups and of larger size than the cups illustrated in Fig. 4. These cups therefore are designed to hold a greater quantity of seed or seed of a larger size than those adapted to be contained in the cups shown in Fig. 4. These enlarged cups, Fig. 5, are indicated by the numeral 11'. It will be understood that any desired number of seed-holders, having different sizes of cups and any desired number thereon, may be provided with each machine, so as to permit different sizes of seed or different kinds of seeds to be planted. If the cup-holding band shown in Fig. 4 is adjusted within the receptacle and it is desired to plant other seed, for which the cups shown in Fig. 5 are better adapted, the cup-holder Fig. 4 is removed from the receptacle and the cup-holder Fig. 5 substituted therefor. This removal is readily accomplished by taking out the split pin at one end of the driving-axle 6 and removing the driving-wheel and then the upwardly-inclined beam 16 and the cover 9. The thumb-screw 12, which holds the cup-holder in position, is then unscrewed, and by bending around the thin metallic cup-holder its diameter can be reduced, so as to permit it to be readily carried out through the opening in the side of the receptacle. The cup-holder Fig. 5 is then inserted and secured in place in an obvious manner.

From the foregoing description it will be seen that my device is adapted for sowing any kind of seed in rows whether such seed be large or small, and that this is accomplished simply by removing one cup-holder and substituting another therefor having larger or smaller cups, as desired.

It will also be obvious that my device when built on a large scale is adapted for sowing fodder-corn, beans, and the various sizes of seed which are drilled.

What I claim as my invention is—

1. In a seed-drill, the combination, of a revolving seed-receptacle, a cup-holder secured to the inside of the receptacle, and revoluble therewith, said holder having a series of cups formed on or secured to one face thereof, and disposed at desired distances apart around the holder, and a seed-spout having its upper end located within the receptacle, and its lower end passing to the exterior of the receptacle, the cups adapted, as they successively reach the highest point of their circular orbit, to discharge into the upper end of the spout.

2. In a seed-drill, the combination, of a revoluble seed-receptacle having an open side, a removable cover for said open side, a cup-holder consisting of a thin flexible band having a series of cups formed on or secured to one face thereof, said holder being releasably secured to and around the interior of the receptacle, and revoluble therewith, and adapted when released from the receptacle and when the side cover of the receptacle is disconnected, to be removed from said receptacle through the side opening thereof, and a seed-spout having its upper end located within the receptacle, and its lower end passing to the exterior of the receptacle.

3. In a seed-drill, the combination, of a main axle, wheels mounted thereon, a seed-receptacle, a projecting beam, a furrow-plow having its shank secured at or in the lower end of the beam, a seed-spout adapted to discharge at the rear of the plow, arms extending downwardly from a medial point of the beam, an axle journaled in said arms, and a covering-wheel mounted on the axle.

4. In a seed-drill, the combination, of an axle, driving-wheels mounted thereon, a seed-receptacle mounted rigidly on the axle between the wheels, said receptacle having an opening in one side, a cup-holder within the receptacle, a cover for the opening of the receptacle, said cover having the axle passing freely therethrough, a beam through which the axle passes freely, said beam being adjacent to the cover of the receptacle, a screw or screws passing through the beam and entering the cover, a seed-spout extending from the interior of the receptacle outwardly through the cover thereof, and a screw extending through a lug of the cover and entering the spout.

In testimony whereof I affix my signature in presence of two witnesses.

ERNEST E. HILLS.

Witnesses:
A. J. WOCHHOLZ,
R. RHOADES.